US012756093B2

(12) United States Patent
Yano

(10) Patent No.: US 12,756,093 B2
(45) Date of Patent: Oct. 6, 2026

(54) WIRELESS COMMUNICATION APPARATUS AND WIRELESS COMMUNICATION SYSTEM

(71) Applicant: 1FINITY Inc., Kawasaki (JP)

(72) Inventor: Tetsuya Yano, Yokohama (JP)

(73) Assignee: 1FINITY Inc., Kawasaki (JP)

( * ) Notice: Subject to any disclaimer, the term of this patent is extended or adjusted under 35 U.S.C. 154(b) by 217 days.

(21) Appl. No.: 18/806,837

(22) Filed: Aug. 16, 2024

(65) Prior Publication Data

US 2024/0405421 A1 Dec. 5, 2024

Related U.S. Application Data

(63) Continuation of application No. PCT/JP2022/008987, filed on Mar. 2, 2022.

(51) Int. Cl.
*H01Q 3/12* (2006.01)
*H01Q 5/378* (2015.01)

(52) U.S. Cl.
CPC ............... *H01Q 3/12* (2013.01); *H01Q 5/378* (2015.01)

(58) Field of Classification Search
None
See application file for complete search history.

(56) References Cited

U.S. PATENT DOCUMENTS 7,161,996 B1 * 1/2007 Steele ..................... H04L 23/02 370/347
2003/0195017 A1 10/2003 Chen et al.
2004/0151269 A1 * 8/2004 Balakrishnan ........ H04L 7/0054 375/355
(Continued)

FOREIGN PATENT DOCUMENTS

JP 2003-529238 A 9/2003
JP 2014-68174 A 4/2014
(Continued)

OTHER PUBLICATIONS

Watanabe et al., "A proposal on propagation environmental control by a virtual massive array", 2019 International Symposium on Antennas and Propagation (ISAP), IEEE, Oct. 30, 2019.
(Continued)

*Primary Examiner* — Pablo N Tran
(74) *Attorney, Agent, or Firm* — Myers Wolin, LLC

(57) ABSTRACT

A wireless communication apparatus includes an antenna element, a parasitic element configured to rotate around a circumference of the antenna element, a wireless transmitter configured to transmit a signal from the antenna element, and processor circuitry configured to be connected to the wireless transmitter; and to execute determining, based on a channel state, a sample timing used for transmission of the signal, transmitting control data for notifying the determined sample timing from the wireless transmitter, performing a weighting process on a plurality of data series by using a weighting factor according to the channel state indicated at the determined sample timing, and transmitting the plurality of data series that have been subjected to the weighting process from the wireless transmitter.

5 Claims, 5 Drawing Sheets

(56) References Cited

U.S. PATENT DOCUMENTS

| | | | | |
|---|---|---|---|---|
| 2005/0195922 | A1* | 9/2005 | Maeda | H04L 25/0328 375/350 |
| 2007/0098125 | A1* | 5/2007 | Vrcelj | H04L 27/2676 375/355 |
| 2009/0089851 | A1* | 4/2009 | Guo | H04N 21/44209 725/125 |
| 2011/0081150 | A1* | 4/2011 | Li | H04B 10/69 398/65 |
| 2011/0207477 | A1* | 8/2011 | Siomina | H04W 56/006 455/67.11 |
| 2015/0381242 | A1* | 12/2015 | Takei | H04B 7/028 375/295 |
| 2021/0243713 | A1* | 8/2021 | Ellenbeck | H04W 56/002 |
| 2022/0038141 | A1 | 2/2022 | Murakami et al. | |
| 2026/0056590 | A1* | 2/2026 | Harder | G05B 13/048 |

FOREIGN PATENT DOCUMENTS

| | | | |
|---|---|---|---|
| JP | 2019-197987 | A | 11/2019 |
| JP | 2020-068494 | A | 4/2020 |
| WO | 2022/038684 | A1 | 2/2022 |

OTHER PUBLICATIONS

Murakami et al., Virtual Massive MIMO (VM-MIMO) Proposal of Virtual Massive MIMO (VM-MIMO), non-official translation, Lecture Proceedings of the 2019 General Conference of IEICE: Communication 1.

International Search Report with the Written Opinion of the International Searching Authority, issued by the Japan Patent Office for corresponding International Patent Application No. PCT/JP2022/008987, mailed on May 31, 2022, with a partial English translation.

* cited by examiner

WIRELESS COMMUNICATION APPARATUS AND WIRELESS COMMUNICATION SYSTEM

CROSS-REFERENCE TO RELATED APPLICATION

This application is a continuation of International Application No. PCT/JP2022/008987, filed on Mar. 2, 2022, the entire contents of which are incorporated herein by reference.

FIELD

The embodiments discussed herein are related to a wireless communication apparatus and a wireless communication system.

BACKGROUND

In recent years, actual operation of the fifth generation mobile communication (5G) has been started, and studies of the sixth generation mobile communication (6G) for the next generation technology is being conducted. A Virtual Massive-MIMO (VM-MIMO) is one of candidate technologies adopted by the 6G communication.

In VM-MIMO, a parasitic element is arranged around a circumference of an antenna that is provided in a wireless communication apparatus disposed on a reception side, a periodic channel fluctuation is produced by rotating the parasitic element at high speed, so that a MIMO reception process is performed on reception signals each having a different sample timing. In other words, the wireless communication apparatus disposed on the reception side separates, by performing the MIMO reception process, a plurality of multiplexed data series that are included in the respective reception signals.

The VM-MIMO as described above does not need to increase the number of antennas as needed for the MIMO, so that the VM-MIMO is a technology capable of suppressing an increase in size of a device and increasing the transmission capacity.

Patent Document 1: Japanese Laid-open Patent Publication No. 2014-68174

Patent Document 2: Japanese Laid-open Patent Publication No. 2019-197987

Patent Document 3: Japanese Laid-open Patent Publication No. 2020-68494

However, there is a problem in that there are no examples to consider the technology for increasing the transmission capacity without increasing the number of antennas provided in the wireless communication apparatus disposed on the transmission side.

In other words, in commonly used MIMO, the transmission capacity is increased by providing a plurality of antennas in both of the wireless communication apparatuses disposed on the transmission side and the reception side, so that the size of each of the wireless communication apparatuses is increased as a result of an increase in the number of antennas. In contrast, in the VM-MIMO, the transmission capacity is increased without increasing the number of antennas provided in the wireless communication apparatus disposed on the reception side. However, in also the VM-MIMO, the wireless communication apparatus disposed on the transmission side still includes a plurality of antennas and transmits a data series from each of the antennas, so that the size of the wireless communication apparatus provided on the transmission side is increased.

SUMMARY

According to an aspect of an embodiment, a wireless communication apparatus includes an antenna element, a parasitic element configured to rotate around a circumference of the antenna element, a wireless transmitter configured to transmit a signal from the antenna element, and a processor configured to be connected to the wireless transmitter, wherein the processor executes a process includes determining, based on a channel state, a sample timing used for transmission of the signal, transmitting control data for notifying the determined sample timing from the wireless transmitter, performing a weighting process on a plurality of data series by using a weighting factor according to the channel state indicated at the determined sample timing, and transmitting the plurality of data series that have been subjected to the weighting process from the wireless transmitter.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Preferred embodiments will be explained with reference to accompanying drawings. The present disclosure is not limited to the embodiments.

Figure 1:
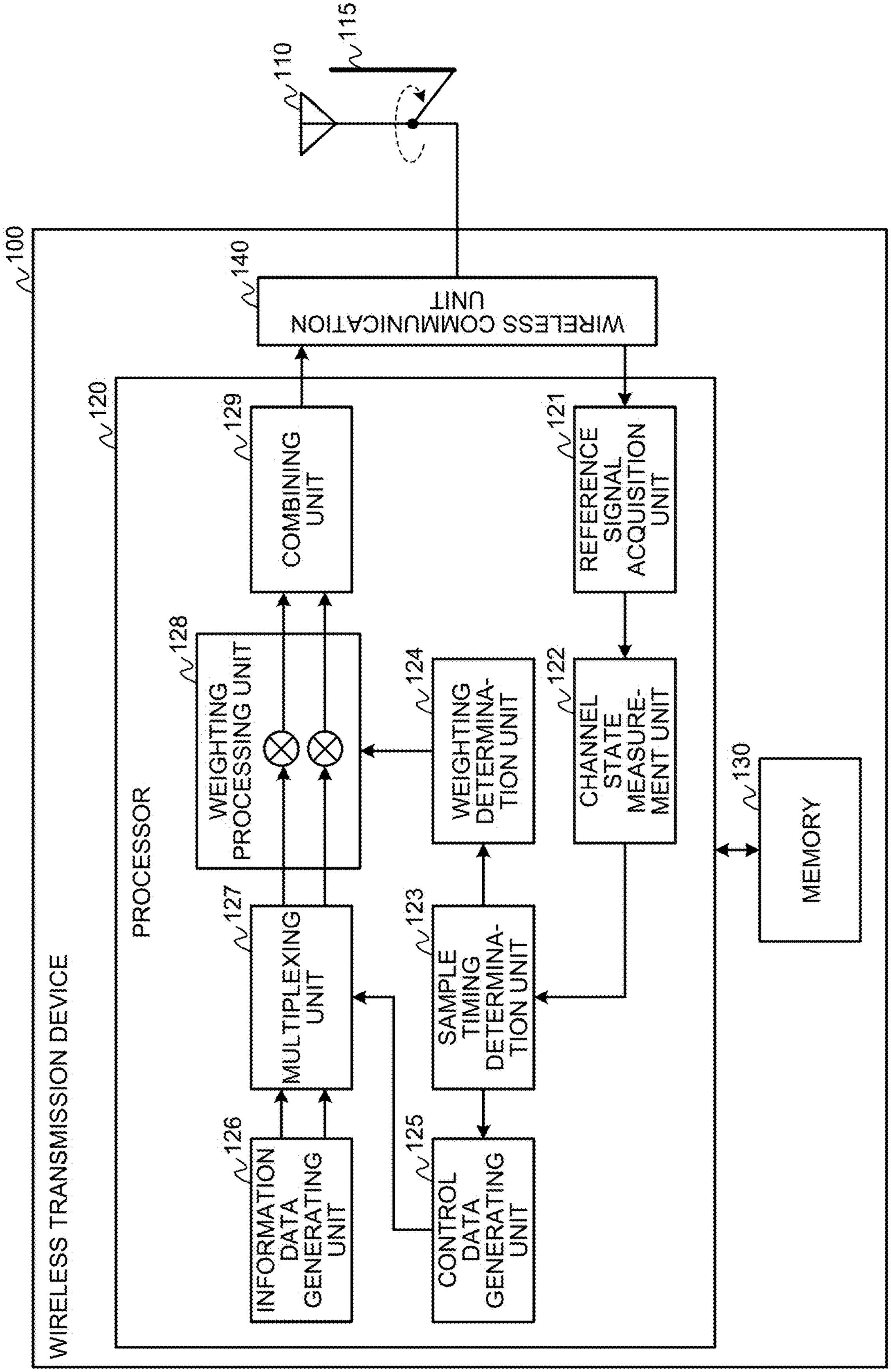
FIG. 1 is a block diagram illustrating a configuration of a wireless transmission device according to one embodiment.

FIG. 1 is a block diagram illustrating a configuration of a wireless transmission device 100 according to one embodiment. The wireless transmission device 100 illustrated in FIG. 1 includes an antenna element 110, a parasitic element 115, a processor 120, a memory 130, and a wireless communication unit 140.

The antenna element 110 is a feeding element that is connected to the wireless communication unit 140, and transmits and receives a radio signal.

The parasitic element 115 is a rod shaped element that is made of metal and that is attached to the antenna element 110, and rotates around the circumference of the antenna element 110 at a predetermined period. As a result of the parasitic element 115 rotating around the circumference of the antenna element 110, a propagation path of a radio signal transmitted from the antenna element 110 is changed at a predetermined period.

The processor 120 includes, for example, a central processing unit (CPU), a field programmable gate array (FPGA), a digital signal processor (DSP), or the like, and performs overall control of the wireless transmission device 100. Specifically, the processor 120 includes a reference signal acquisition unit 121, a channel state measurement unit 122, a sample timing determination unit 123, a weighting determination unit 124, a control data generating unit 125, an information data generating unit 126, a multiplexing unit 127, a weighting processing unit 128, and a combining unit 129.

The reference signal acquisition unit 121 acquires a reference signal used for channel estimation received by the wireless communication unit 140. The reference signal is an already-known signal that is transmitted from a wireless reception device that is a communication partner of the wireless transmission device 100.

The channel state measurement unit 122 estimates a channel state by using the reference signal that is acquired by the reference signal acquisition unit 121. In other words, the channel state measurement unit 122 measures, on the basis of the channel estimation that is performed by using the reference signal, the channel state of the channel running from the wireless reception device toward the wireless transmission device 100. Furthermore, here, the wireless transmission device 100 and the wireless reception device performs wireless communication based on the Time Division Duplexing (TDD) technology, so that it is assumed that the channel running from the wireless reception device toward the wireless transmission device 100 and the channel running from the wireless transmission device 100 toward the wireless reception device have a symmetric property, and it is assumed that the channel states of both of the channels are substantially the same.

The sample timing determination unit 123 determines, on the basis of the channel state, a sample timing that is used for wireless transmission of a signal. At this time, the sample timing determination unit 123 may determine a sample timing in which, for example, the channel state is better than a predetermined criteria, as a sample timing that is used for the wireless transmission of the signal.

The weighting determination unit 124 determines a weighting factor that is related to each of a plurality of data series that are simultaneously transmitted and that corresponds to the sample timing determined by the sample timing determination unit 123. The weighting factor determined by the weighting determination unit 124 is a weighting factor for correcting an influence exerted on the signal caused by the channel state indicated at a sample timing, and, for example, a pseudo propagation path coefficient or a diffuse series may be used as the weighting factor.

The control data generating unit 125 generates control data used for notifying the wireless reception device of the sample timing that has been determined by the sample timing determination unit 123.

The information data generating unit 126 generates information data including information to be transmitted. At this time, the information data generating unit 126 generates information data included in a plurality of data series that are simultaneously transmitted. The plurality of data series may include the same information data, or may include different pieces of information data.

The multiplexing unit 127 multiplexes the information data, the control data, and the reference signal. In other words, the multiplexing unit 127 arranges the information data, the control data, and the reference signal at each time and frequency.

The weighting processing unit 128 assigns a weight to each of the plurality of data series including the information data by using the weighting factor that has been determined by the weighting determination unit 124. Specifically, the weighting processing unit 128 includes a multiplier associated with each of the data series, and multiplies the weighting factor for each data series by each of the data series.

The combining unit 129 combines the plurality of data series including the information data. Then, the combining unit 129 outputs the transmission signal that has been obtained by combining the plurality of data series to the wireless communication unit 140. Furthermore, the combining unit 129 outputs the transmission signal that includes the control data and the transmission signal that includes the reference signal to the wireless communication unit 140.

The memory 130 includes, for example a random access memory (RAM), a read only memory (ROM), or the like, and stores therein information that is used for a process performed by the processor 120.

The wireless communication unit 140 performs a predetermined wireless transmission process, such as digital/analog (D/A) conversion and up-conversion, on the transmission signal that is output from the combining unit 129, and wirelessly transmits the processed signal from the antenna element 110. The transmission signal that is wirelessly transmitted from the antenna element 110 is transmitted to the wireless reception device through the propagation path that is provided in accordance with the rotation of the parasitic element 115. Furthermore, the wireless communication unit 140 performs a predetermined wireless reception process, such as down-conversion and analog/digital (A/D) conversion, on the reference signal that is received by the antenna element 110, and outputs the processed signal to the processor 120.

Figure 2:
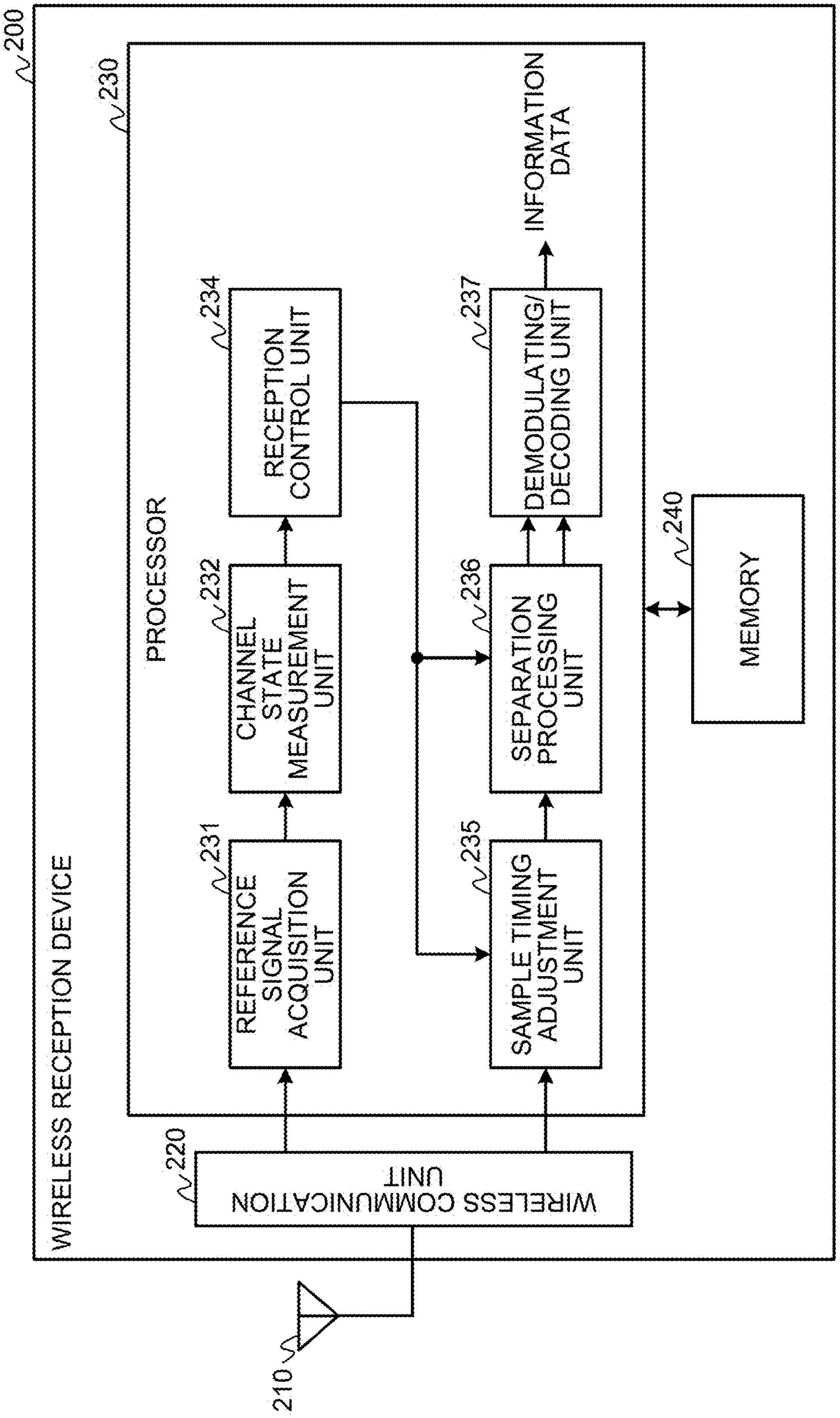
FIG. 2 is a block diagram illustrating a configuration of a wireless reception device according to one embodiment.

FIG. 2 is a block diagram illustrating a configuration of a wireless reception device 200 according to one embodiment. The wireless reception device 200 receives a transmission signal that is transmitted from the wireless transmission device 100 illustrated in FIG. 1. The wireless reception device 200 illustrated in FIG. 2 includes an antenna element 210, a wireless communication unit 220, a processor 230, and a memory 240.

The antenna element 210 is a feeding element that is connected to the wireless communication unit 220, and transmits and receives a radio signal.

The wireless communication unit 220 performs a predetermined wireless reception process, such as down-conversion and A/D conversion, on the reception signal received by the antenna element 210, and outputs the processed signal to the processor 230. Furthermore, the wireless communication unit 220 wirelessly transmits the reference signal from the antenna element 110 to the wireless transmission device 100.

The processor 230 includes, for example, a CPU, a FPGA, a DSP, or the like, and performs overall control of the wireless reception device 200. Specifically, the processor 230 includes a reference signal acquisition unit 231, a channel state measurement unit 232, a reception control unit 234, a sample timing adjustment unit 235, a separation processing unit 236, and a demodulating/decoding unit 237.

The reference signal acquisition unit 231 acquires a reference signal that is used for channel estimation and that is included in the reception signal received by the wireless communication unit 220. The reference signal is an already-known signal that is transmitted from the wireless transmission device 100.

The channel state measurement unit 232 measures a channel state by using the reference signal that is acquired by the reference signal acquisition unit 231. In other words, the channel state measurement unit 232 measures, on the basis of the channel estimation performed by using the reference signal, the channel state of the channel running from the wireless transmission device 100 toward the wireless reception device 200.

The reception control unit 234 acquires the control data from the reception signal that is received by the wireless communication unit 220, and controls reception of the information data on the basis of the control data and the channel state. Specifically, the reception control unit 234 corrects, in accordance with the channel state, the sample timing that is notified by the control data, and then notifies the sample timing adjustment unit 235 of the obtained reception sample timing. Furthermore, the reception control unit 234 determines the weighting factor that is in accordance with the channel state indicated at the reception sample timing, and notifies the separation processing unit 236 of the determined weighting factor.

The sample timing adjustment unit 235 acquires, in accordance with the reception sample timing notified from the reception control unit 234, the signal obtained at the reception sample timing from the reception signal that is received by the wireless communication unit 220.

The separation processing unit 236 assigns a weight to a signal obtained at a reception sample timing by using the weighting factor that is notified from the reception control unit 234, and separates the plurality of data series that are combined in the wireless transmission device 100.

The demodulating/decoding unit 237 demodulates and decodes each of the plurality of data series, and obtains the information data. The plurality of data series includes the same information data or a piece of information data that differs from each other.

The memory 240 includes, for example, a RAM, a ROM, or the like, and stores therein information that is used for the process performed by the processor 230.

Figure 3:
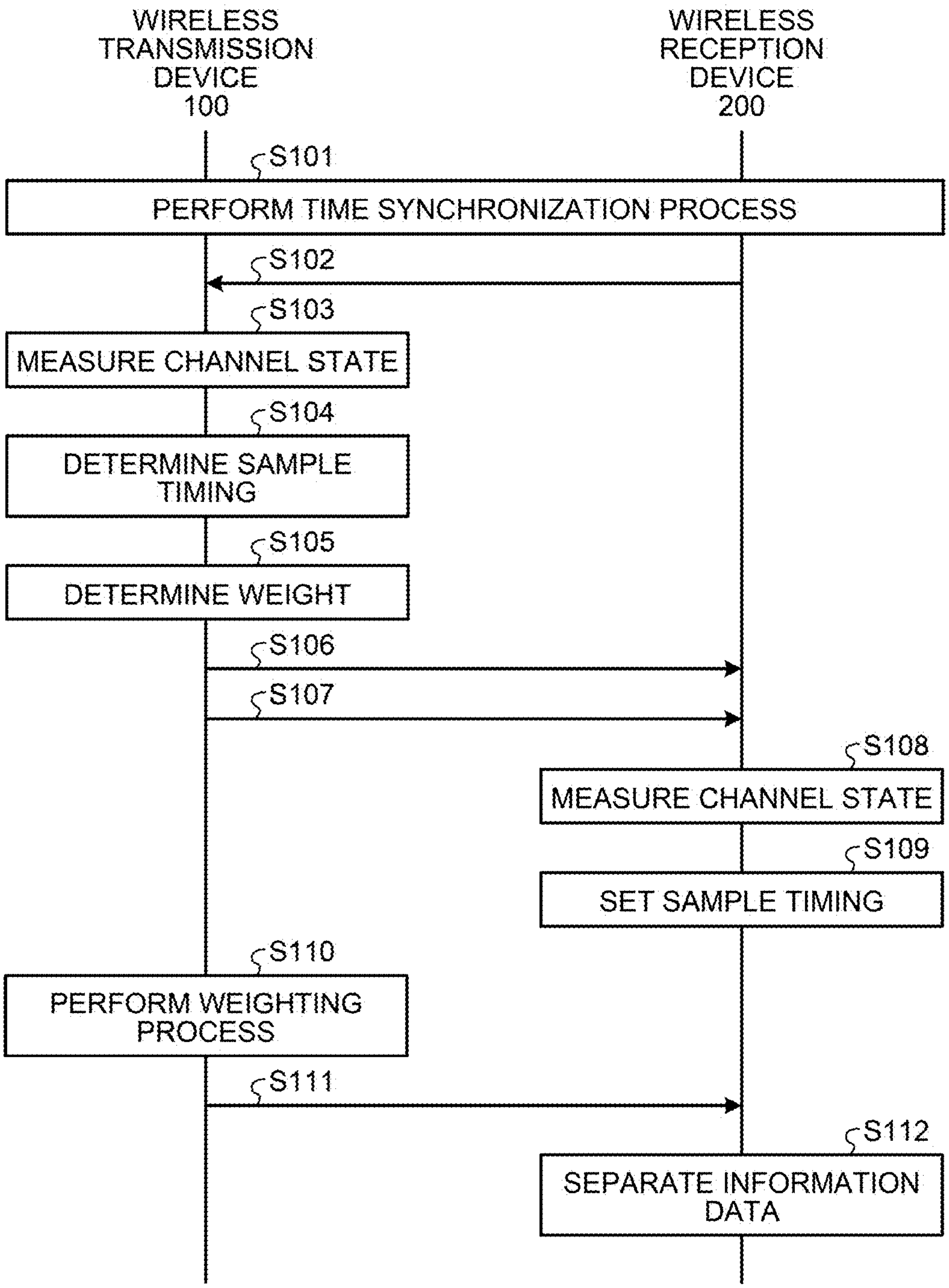
FIG. 3 is a sequence diagram illustrating a wireless communication method according to one embodiment.

In the following, a wireless communication method performed by the wireless transmission device 100 and the wireless reception device 200 that are configured as described above will be described with reference to the sequence diagram illustrated in FIG. 3.

When the wireless transmission device 100 and the wireless reception device 200 perform wireless communication, a time synchronization process is performed between these devices (Step S101). The time synchronization process is able to be performed by using, for example, a precision time protocol (PTP) or a global positioning system (GPS). As a result of the wireless transmission device 100 and the wireless reception device 200 performing the time synchronization, it is possible to transmit and receive a signal to and from these two devices.

Accordingly, the wireless reception device 200 transmits the reference signal that is used for channel measurement (Step S102). The transmission of the reference signal performed by the wireless reception device 200 may be periodically performed. The reference signal is received by the wireless communication unit 140 included in the wireless transmission device 100, and is acquired by the reference signal acquisition unit 121. Then, as a result of the reference signal being used by the channel state measurement unit 122, the channel state of the channel running from the wireless reception device 200 toward the wireless transmission device 100 is measured (Step S103). The channel state is notified to the sample timing determination unit 123, and the sample timing based on the channel state is determined (Step S104). In other words, for example, the sample timing in which the channel state is better than the predetermined criteria is determined as the sample timing that is used for the wireless transmission of the signal.

If the sample timing has been determined, the weighting factors of the plurality of respective data series that are simultaneously transmitted are determined in accordance with the sample timing by the weighting determination unit 124 (Step S105). The determined weighting factor is set in the weighting processing unit 128. Furthermore, the control data that is used to notify the sample timing is generated by the control data generating unit 125, and is transmitted from the wireless communication unit 140 to the wireless reception device 200 (Step S106). In addition, the wireless transmission device 100 transmits the reference signal that is used for the channel measurement (Step S107). The transmission of the reference signal performed by the wireless transmission device 100 may be periodically performed.

The control data and the reference signal is received by the wireless communication unit 220 included in the wireless reception device 200, and, as a result of the reference signal being used by the channel state measurement unit 232, the channel state of the channel running from the wireless transmission device 100 toward the wireless reception device 200 is measured (Step S108). Then, the sample timing that is notified by the control data is corrected on the basis of the channel state by the reception control unit 234, and the reception sample timing is determined. The determined reception sample timing is set in the sample timing adjustment unit 235 (Step S109).

In contrast, in the wireless transmission device 100, the information data included in the plurality of data series is generated, and the weighting process is performed on each of the data series by the weighting processing unit 128 (Step S110). At this time, the channel state is changed due to the rotation of the parasitic element 115, so that the weighting process may be performed by using the weighting factor that is different at each sample timing in accordance with the rotational period of the parasitic element 115. The information data included in the plurality of data series that have been subjected to the weighting process are combined by the combining unit 129, and are then wirelessly transmitted from the antenna element 110 (Step S111).

Figure 4A:
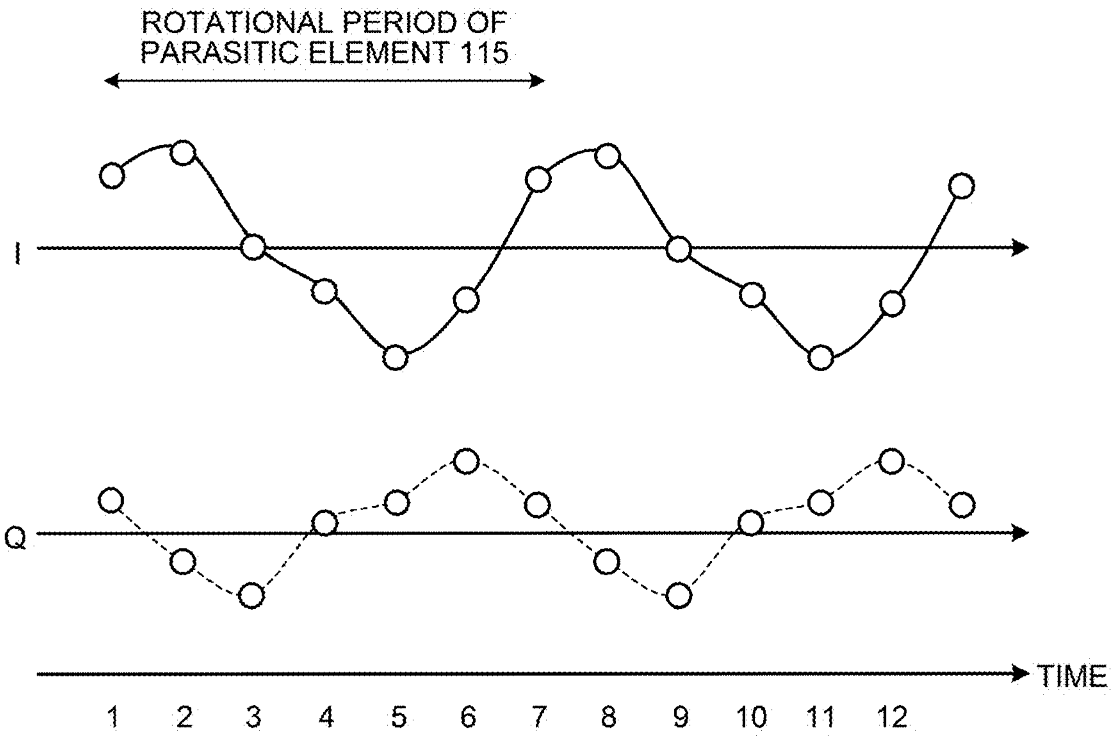
FIG. 4A is a diagram illustrating a specific example of a reception signal.
Figure 4B:
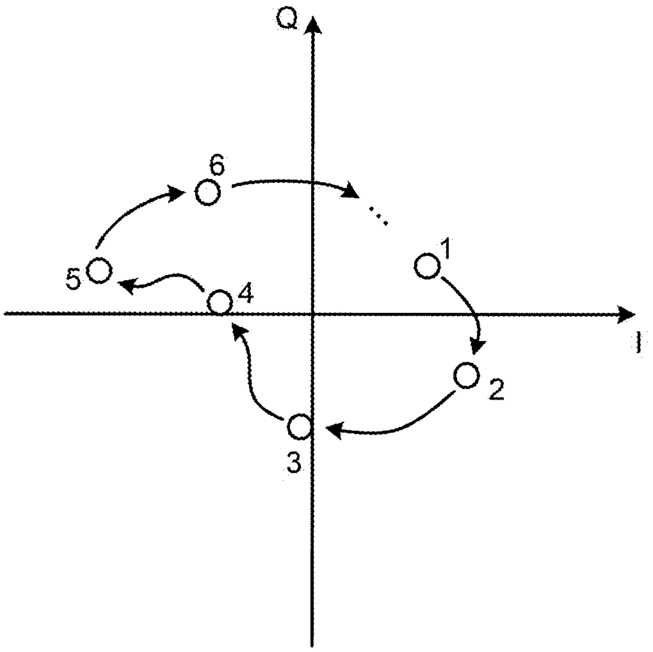
FIG. 4B is a diagram illustrating a specific example of a reception signal.

The parasitic element 115 rotates around the circumference of the antenna element 110, so that the signal transmitted from the antenna element 110 is accordingly transmitted through the channel that fluctuates for each sample timing. Specifically, for example, as indicated by illustrated in FIG. 4A, the I component and the @ component included in the signal are periodically changed in accordance with the rotational period of the parasitic element 115. If the signal is indicated on the IQ plane, for example, as indicated by illustrated in FIG. 4B, a signal point rotates in accordance with the rotational period of the parasitic element 115. In this way, the signal that has been transmitted through the channel that is changed for each sample timing is received by the antenna element 210 included in the wireless reception device 200.

Then, the reception signal is input to the sample timing adjustment unit 235 in which the reception sample timing has been set, and the signal at the reception sample timing is acquired from the reception signal. The signal at the reception sample timing is weighted by the separation processing unit 236, and is separated into pieces of information data included in the plurality of data series (Step S112). Then, the pieces of information data included in each of the data series are demodulated and decoded by the demodulating/decoding unit 237.

As described above, according to the present embodiment, the parasitic element that rotates around the circumference of the antenna element included in the wireless transmission device is provided, the sample timing that has been determined in accordance with the channel state by the wireless transmission device is notified to the wireless reception device, a weight is assigned, and the plurality of data series are transmitted. Consequently, the wireless reception device is able to extract the signal corresponding to the notified sample timing from the reception signal that has been received via the channel that is changed in accordance with the rotational period of the parasitic element, and is able to separate the plurality of data series. As a result of this, it is possible to increase the transmission capacity while suppressing an increase in size of the device.

Moreover, in the above described one embodiment, the wireless transmission device 100 and the wireless reception device 200 perform wireless communication on the basis of TDD, so that it is assumed that the channel states of the channel running from the wireless reception device 200 toward the wireless transmission device 100 and the channel running from the wireless transmission device 100 toward the wireless reception device 200 are substantially the same. However, in also a case where the wireless transmission device 100 and the wireless reception device 200 perform wireless communication on the basis of frequency division duplex (FDD), it is possible to perform the same wireless communication method as described in the above described one embodiment. However, in the case where the wireless communication is performed on the basis of FDD, the channel state measured by the wireless reception device 200 is reported to the wireless transmission device 100, and the wireless transmission device 100 determines the sample timing on the basis of this report.

Figure 5:
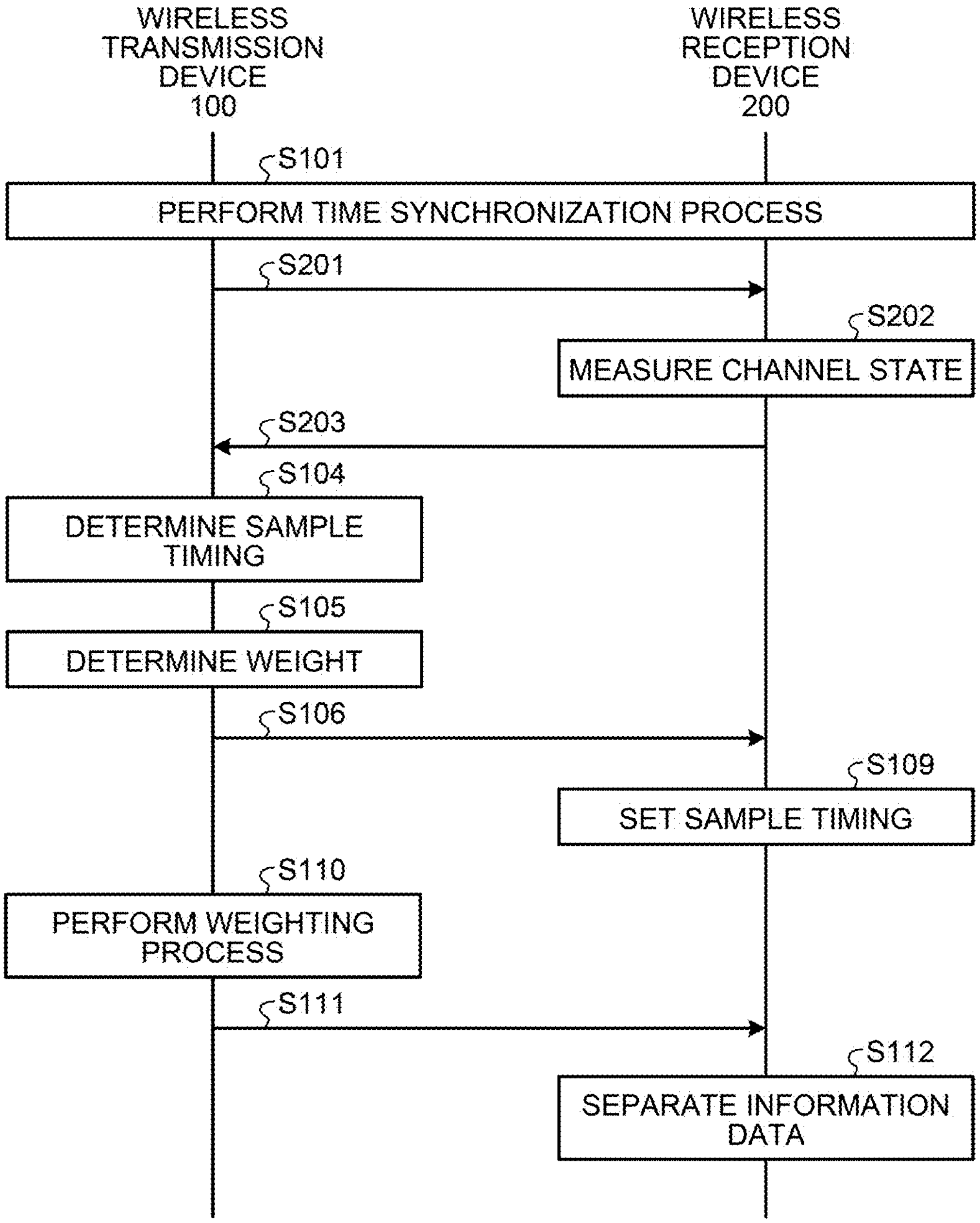
FIG. 5 is a sequence diagram illustrating a wireless communication method according to another embodiment.

FIG. 5 is a sequence diagram illustrating a wireless communication method that is used when wireless communication is performed on the basis of FDD. In FIG. 5, components that are the same as those illustrated in FIG. 3 are assigned the same reference numerals and descriptions thereof in detail will be omitted.

When the wireless transmission device 100 and the wireless reception device 200 perform wireless communication, a time synchronization process is performed between these devices (Step S101). Then, the wireless transmission device 100 transmits a reference signal that is used for the channel measurement (Step S201). The transmission of the reference signal performed by the wireless transmission device 100 may be periodically performed. The reference signal is received by the wireless communication unit 220 included in the wireless reception device 200, and is acquired by the reference signal acquisition unit 231. Then, as a result of the reference signal being used by the channel state measurement unit 232, the channel state of the channel running from the wireless transmission device 100 toward the wireless reception device 200 is measured (Step S202). The measured channel state is reported to the wireless transmission device 100 by report information (Step S203). In other words, the wireless reception device 200 generates report information for reporting the channel state of the channel running from the wireless transmission device 100 toward the wireless reception device 200, and transmits the generated report information to the wireless transmission device 100.

The channel state reported from the wireless reception device 200 is notified to the sample timing determination unit 123 included in the wireless transmission device 100, and the sample timing based on the channel state is determined (Step S104). The sample timing that is determined at this time is obtained on the basis of the channel state of the channel running from the wireless transmission device 100 toward the wireless reception device 200, and it is possible to determine the sample timing in accordance with the channel associated with the frequency by which the signal is actually transmitted.

When the sample timing has been determined, a weighting factor of each of the plurality of data series that are simultaneously transmitted is determined by the weighting determination unit 124 in accordance with the sample timing (Step S105). The determined weighting factor is set in the weighting processing unit 128. Furthermore, the control data that is used to notify the sample timing is generated by the control data generating unit 125, and is transmitted from the wireless communication unit 140 to the wireless reception device 200 (Step S106). The control data is received by the wireless communication unit 220 included in the wireless reception device 200, and the sample timing that is notified by the control data by the reception control unit 234 is set in the sample timing adjustment unit 235 as the reception sample timing (Step S109).

On the other hand, in the wireless transmission device 100, the information data included in the plurality of data series is generated, and the weighting process is performed on each of the data series by the weighting processing unit 128 (Step S110). The pieces of information data that are included in the plurality of data series that have been subjected to the weighting process are combined by the combining unit 129, and are then wirelessly transmitted from the antenna element 110 (Step S111). The signal that has been wirelessly transmitted is received by the wireless reception device 200, and the reception signal is input to the sample timing adjustment unit 235 in which the reception sample timing has been set. Then, the signal obtained at the reception sample timing is acquired from the reception signal, and the acquired signal is weighted by the separation processing unit 236, so that the signal is separated into the pieces of information data included in the plurality of data series (Step S112). The pieces of information data included in each of the data series are demodulated and decoded by the demodulating/decoding unit 237.

In this way, even in the case where FDD that uses different frequencies between the channel running from the wireless transmission device 100 toward the wireless reception device 200 and the channel running from the wireless reception device 200 toward the wireless transmission device 100, it is possible to increase the transmission capacity while suppressing an increase in size of the device.

According to an aspect of an embodiment of the wireless communication apparatus and the wireless communication system disclosed in the present disclosure, an advantage is provided in that it is possible to increase the transmission capacity while suppressing an increase in size of a device.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. A wireless communication apparatus comprising:

an antenna element;

a parasitic element configured to rotate around a circumference of the antenna element;

a wireless transmitter configured to transmit a signal from the antenna element; and processor circuitry configured:

to be connected to the wireless transmitter and;

to execute:

determining, based on a channel state, a sample timing used for transmission of the signal;

transmitting control data for notifying the determined sample timing from the wireless transmitter;

performing a weighting process on a plurality of data series by using a weighting factor according to the channel state indicated at the determined sample timing; and transmitting the plurality of data series that have been subjected to the weighting process from the wireless transmitter.

2. The wireless communication apparatus according to claim 1, wherein the determining includes:

measuring the channel state by using a received reference signal, and determining the sample timing based on the measured channel state.

3. The wireless communication apparatus according to claim 1, wherein the determining includes:

receiving report information for reporting a measurement result of the channel state, and determining the sample timing based on the reported channel state.

4. A wireless communication apparatus comprising:

an antenna element;

a wireless receiver configured to receive a signal by the antenna element; and processor circuitry configured:

to be connected to the wireless receiver; and to execute:

acquiring control data for notifying a sample timing used for transmission of the signal;

acquiring, from the reception signal received by the wireless receiver, the signal corresponding to the notified sample timing;

separating, by using a weighting factor according to a channel state indicated at the notified sample timing, a plurality of data series included in the acquired signal; and decoding the separated plurality of data series.

5. A wireless communication system comprising:

a first wireless communication apparatus; and a second wireless communication apparatus, wherein the first wireless communication apparatus includes:

a first antenna element, a parasitic element configured to rotate around a circumference of the first antenna element, a wireless transmitter configured to transmit a signal from the first antenna element, and first processor circuitry configured:

to be connected to the wireless transmitter; and to execute determining, based on a channel state, a sample timing used for transmission of the signal;

transmitting control data for notifying the determined sample timing from the wireless transmitter;

performing a weighting process on a plurality of data series by using a weighting factor according to the channel state indicated at the determined sample timing; and transmitting the plurality of data series that have been subjected to the weighting process from the wireless transmitter, and the second wireless communication apparatus includes:

a second antenna element, a wireless receiver configured to receive the signal by the second antenna element, and second processor circuitry configured:

to be connected to the wireless receiver; and to execute acquiring the control data that is transmitted from the first wireless communication apparatus;

acquiring, from the reception signal received by the wireless receiver, the signal corresponding to the sample timing notified by the control data;

separating, by using the weighting factor according to the channel state indicated at the notified sample timing, the plurality of data series included in the acquired signal; and decoding the separated plurality of data series.

* * * * *